April 26, 1938.   R. COE   2,114,995
RESTRAINING DEVICE FOR ANIMALS
Filed April 8, 1937   2 Sheets-Sheet 1
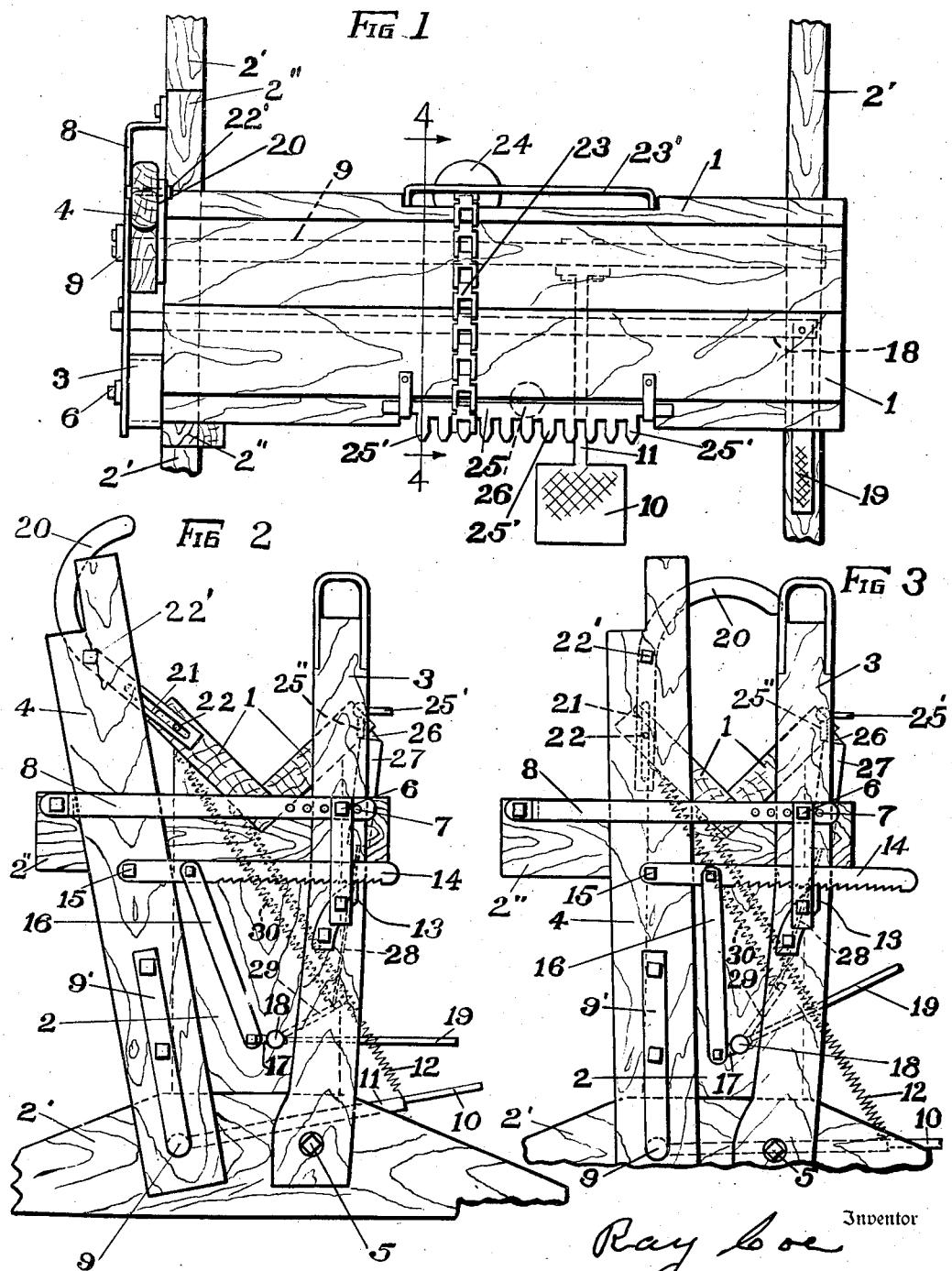

April 26, 1938.  R. COE  2,114,995
RESTRAINING DEVICE FOR ANIMALS
Filed April 8, 1937  2 Sheets-Sheet 2
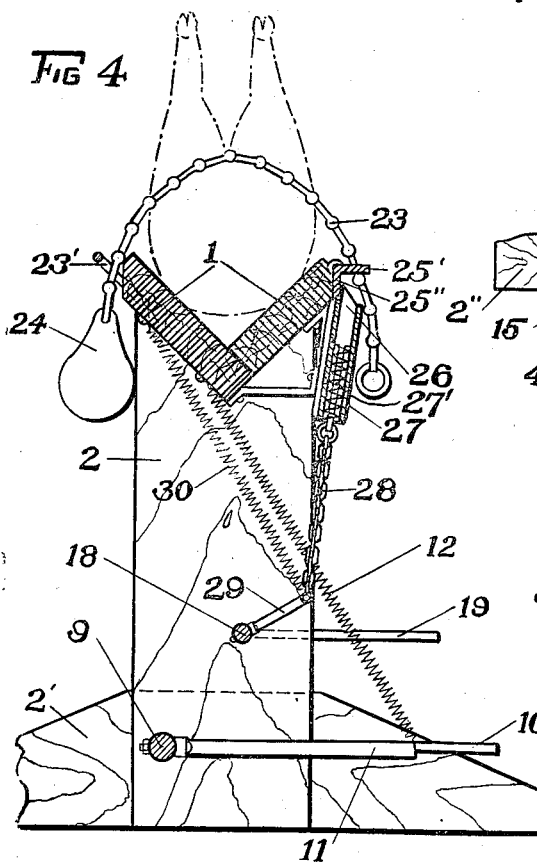
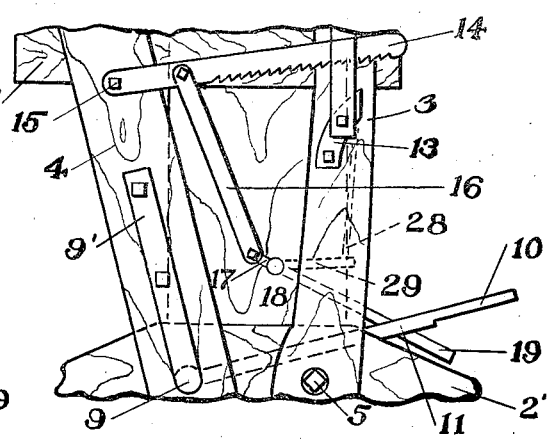
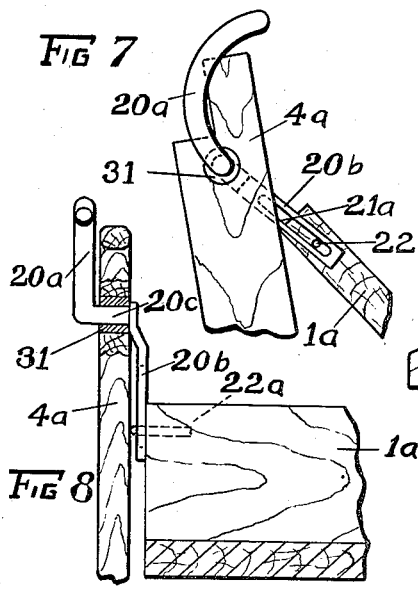
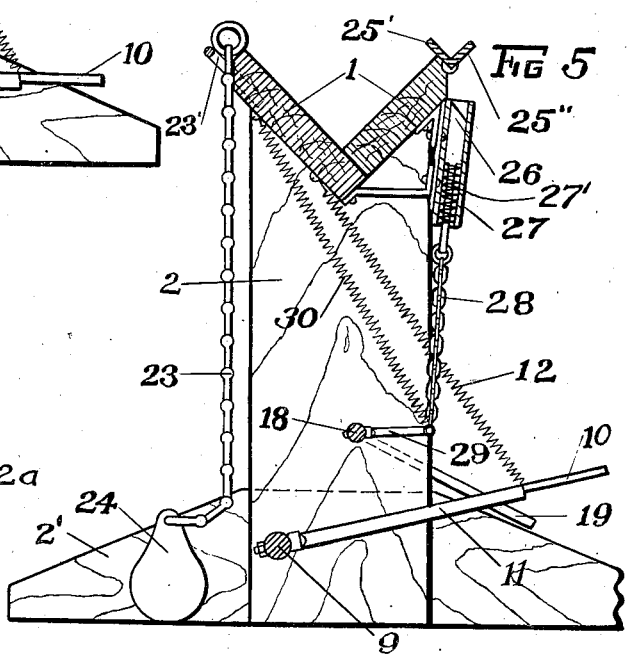
Inventor
Ray Coe
Attorneys Patented Apr. 26, 1938

2,114,995

UNITED STATES PATENT OFFICE 2,114,995

RESTRAINING DEVICE FOR ANIMALS

Ray Coe, Jeffersonville, Ohio

Application April 8, 1937, Serial No. 135,734

11 Claims. (Cl. 119—103)

This invention relates to restraining devices for animals to confine the animal during certain operations to be performed thereon; it relating more particularly to a restraining device for small hogs although not necessarily limited to that class of animals.

An object of the invention is to provide a device of this character which will be simple in construction, economical in manufacture and effective for the purpose for which it is designed.

Another object of the invention is to provide an improved form of clamping device for the head of the animal, including a foot-operated treadle for operating such device.

A further object of the invention is to provide an improved form of restraining device for the rear quarter of the animal.

A further object of the invention is to provide foot-operated means for simultaneously releasing the head clamping device and the restraining device for the rear quarter of the animal.

In the accompanying drawings:

Fig. 1 is a top plan view of an apparatus embodying the improvements.

Fig. 2 is an elevation of what will be called the forward end of the apparatus with the clamping devices for the animal's head in open position.

Fig. 3 is an elevation of the forward end of the apparatus with the clamping devices for the head of the hog in closed position.

Fig 4 is a vertical section on the line 4—4 of Fig. 1 showing the restraining device for the rear quarter of the animal in operative position.

Fig. 5 is also a section on the line 4—4 of Fig. 1 but showing some of the parts in a different position from that shown in Fig. 4.

Fig. 6 is a fragmentary elevation of the forward end showing some of the parts illustrated in Figs. 2 and 3 illustrating more clearly the manner of releasing the head clamping devices.

Fig. 7 is a detail showing a modification in some of the parts of the head clamping devices, the view being an end elevation showing a portion of the upper part of the movable clamping member and a portion of the cradle showing a modified form of the auxiliary clamping device.

Fig. 8 is a detail of the same modification, the view being a side elevation.

Referring to the drawings, I represents a cradle in which the animal is placed, this cradle being preferably constructed of two pieces of wood and being of a V-shape and being supported by legs 2 having feet 2'. At the front end of the cradle is a cross bar 2", this cross bar being secured in any suitable way to the outer side of one of the legs and forming a support for some of the parts. To restrain the head of the animal there is located at the front end of the apparatus two clamping members 3 and 4. The clamping member 3 has its lower end pivotally connected as at 5 with the foot 2' at that end of the apparatus, and this clamping member is normally held stationary, although provision is made for adjusting it to or from the other clamping member through the medium of a bolt 6 and a series of openings in the end of a strap 8, the other end of the strap being secured to the support 2". This adjustment is merely to accommodate different sized animals.

The other clamping member 4 has its lower end secured to the longitudinally extending rock shaft 9, the rock shaft having an upturned end 9' which is bolted to the lower end of the clamping member 4. The rock shaft is journaled in the legs 2 and their feet secured thereto. Between the legs is a foot pedal 10 by which the shaft may be rocked by the foot of the operator; this pedal being on the lever arm 11 which has its inner end fastened to the rock shaft. A coil spring 12 is attached to the outer end of the lever arm 11 at its lower end and connected to the under side of the cradle at its upper end and normally tends to hold the movable clamping member 4 in open position.

When the shaft 9 is rocked to move the clamping member 4 to clamping position it is held in different positions of adjustment by a detent 13 secured to what will be called the stationary clamping member 3 which cooperates with the ratchet member 14 pivotally connected as at 15 to the clamping member 4. This ratchet member 14 is pivotally connected by a link 16 with a short arm 17 fast on another longitudinally extending rock shaft 18, journalled in the legs 2, it being extended through the rear leg and having fast thereon a foot pedal 19 whereby the shaft may be rocked to raise the ratchet member 14 out of engagement with the detent so that the spring 12 will rock the shaft 9 which is connected to the clamping member 4 to throw the clamping member 4 to the open position shown in Fig. 2.

Pivoted as at 22' to the inner side of the upper end of the movable clamping member 4 is an arm 20, the outer end of which is formed on a curve as shown and the inner end of which has a slot 21 through which a pin 22 on the cradle 1 extends, this arm 20 forming an auxiliary clamping member. When the clamping members 3 and 4 are in the open position shown in Fig. 2 this auxiliary clamping member 20 occupies the position shown in that figure, but when the clamping member 4 is swung to clamping position this auxiliary clamping member will be automatically swung to the position shown in Fig. 3 so as to extend over the throat of the hog in the cradle, it being understood that the hog is placed in the cradle on its back.

The hind quarters of the hog are restrained by a flexible device which in the present case is shown as a chain 23 (Figs. 1, 4, and 5). One end of this chain passes through a loop 23' and has a weight 24 and any one of the links of the other end of the chain is adapted to engage any one of the teeth 25' of a longitudinally extending toothed member 25 which is pivotally mounted upon one edge of the cradle after the chain has been drawn tightly over the body of the animal; the weight contacting the loop 23' acting as a stop. This toothed member has an angularly extending flange 25" adapted to be engaged by a detent in the form of a bolt 26, slidably mounted in a housing 27, and normally urged upward by a coil spring 27' in the housing, the lower end of the bolt being connected by a chain 28 to an arm 29 on the rock shaft 18, a coil spring 30 connecting this arm with the bottom of the cradle. When this rock shaft is rocked to release the clamping member 4 and auxiliary clamping member 20 it will, therefore, also cause the detent bolt 26 to release the rockable toothed member and therefore release the restraining chain 23. When the chain is released the weight will cause the chain to assume the position shown in Fig. 5.

As soon as the chain 23 is released from the rockable toothed member 25', the toothed member will drop back to normal position by gravity and if the operator holds his foot on the pedal 19 long enough the detent 26 will engage the portion 25" of the rockable toothed member and hold it in the position shown in Fig. 4. In the event, however, that the foot pedal should be released too quickly the portion 25" of the rockable toothed member may strike the beveled upper end of the bolt so as to require another operation of the foot pedal to cause the bolt to engage and hold the rockable toothed member; or, if desired, the rockable toothed member may be pushed down against the beveled face of the bolt so as to cause the bolt to again engage it.

By this construction it will be seen that effective restraining devices are provided not only for the head of the animal but also for the rear quarter thereof and that convenient foot-operated means are provided for bringing the head clamping devices to operative position and also convenient foot-operated devices provided for releasing not only the head clamping device but also the restraining devices for the rear quarter of the animal.

Referring to Figs. 7 and 8 there is shown a modification in the form of the auxiliary clamping device. In this case the auxiliary clamping device is in two parts, 20a and 20b. The part 20a is bent at right angles as indicated at 20c, having the part 20b connected in any suitable way to the outer end thereof. The portion 20c is journalled in a bushing 31 located in an aperture in the movable clamping member 4a. The part 20b is provided with a slotted opening 21a to receive a pin 22a which projects from the cradle 1a. This arrangement provides for a better support for the auxiliary clamping device than that illustrated in the other figures.

Having thus described my invention, I claim:

1. In a restraining device for animals, a cradle, a pair of clamps for the head of the animal at one end of the cradle, one at least of said clamps being movable, foot-operated means for operating said movable clamping member, a detent to hold said movable clamping member in different positions of adjustment, foot-operated means for releasing said detent and a restraining device near the other end of the cradle for the hind quarters of the animal.

2. In a restraining device for animals, a cradle, a pair of clamps at one end of the cradle for the head of the animal, one at least of which is movable, foot-operated means for operating said clamping member, an auxiliary clamping member for the throat of the animal pivotally connected to said movable clamping member, means for swinging said auxiliary clamping member to clamping position when the movable member is operated to clamping position, and a restraining device for the hind quarters of the animal near the other end of the cradle.

3. In a restraining device for animals, a cradle, a pair of clamping members for the head of the animal near one end of the cradle, one at least of which is movable, foot-operated means for operating said movable clamping member, means for holding said movable clamping member in different positions of adjustment consisting of a rack bar pivotally connected therewith and a detent on the other clamping member cooperating with said rack bar, foot-operated means for releasing said rack bar from said detent including a spring to restore said movable clamping member to inoperative position, and a restraining device near the other end of the cradle for the hind quarters of the animal.

4. In a restraining device for animals, a cradle, a pair of clamping members at one end of said cradle, one at least of which is movable, foot-operated means for operating said movable clamping member, an auxiliary clamping member pivotally connected with said movable clamping member, one end of which is curved and the other end provided with an elongated slot, a pin carried by said cradle projecting into said slot, and a restraining device near the other end of the cradle for the hind quarters of the animal.

5. In a restraining device for animals, a cradle, a pair of clamping members at one end of said cradle, one of which is stationary and the other movable, a rock shaft to which said movable clamping member is connected, a foot pedal connected with said rock shaft to move said movable clamping member to clamping position, a spring to restore said movable clamping member to inoperative position, devices to hold said movable clamping member in different positions of adjustment, foot-operated means to release said devices to permit said spring to restore said movable clamping member to inoperatve position, and a restraining device near the other end of the cradle for the hind quarters of the animal.

6. In a restraining device for animals, a cradle, clamping devices at one end of said cradle for the head of an animal in said cradle, a restraining device for the hind quarters of the animal consisting of a flexible member adapted to extend across the animal, a weight on one end of said flexible device, and a latching device for the other end of said flexible device, said latching device consisting of a longitudinally extending member having a plurality of teeth, said flexible member adapted to be engaged by any one of said teeth.

7. In a restraining device for animals, a cradle, clamping devices at one end of said cradle for the head of an animal in said cradle, a restraining device for the hind quarters of the animal consisting of a flexible member adapted to extend across the animal, a weight on one end of said flexible device, a latching device for the other end of said flexible device, said latching device consisting of a longitudinally extending member having a plurality of teeth, said flexible member adapted to be engaged by any one of said teeth, and a foot-operated detent for said toothed member.

8. In a restraining device for animals, a cradle, clamping devices at one end of said cradle for the head of an animal in said cradle, a flexible chain near the other end of said cradle adapted to extend across the hind quarters of the animal, a weight on one end of said chain, an angularly-shaped longitudinally extending member pivoted to said cradle, a plurality of teeth on the horizontal portion of said angular member, the links of said chain being adapted to engage any one of the teeth of said member, a spring-pressed bolt to engage the vertical flange of said member, and a foot-operated treadle to retract said bolt to release said member.

9. In a restraining device for animals, a cradle, a pair of clamping members at one end of said cradle to engage the head of an animal in said cradle, one of which is movable toward the other, foot-operated means for adjusting said movable clamping member, devices for holding said movable clamping member in different positions of adjustment, a flexible restraining device near the other end of said cradle, a weight on one end of said flexible device, a device for engaging the other end of said flexible restraining device, a detent for said engaging device, and foot-operated means for simultaneously releasing said last-mentioned device and also the holding device for the movable head clamp.

10. In a restraining device for animals, a cradle, a pair of clamping member at one end of said cradle for the head of an animal in said cradle, one of which is stationary and the other movable, a rock shaft to which said movable member is connected, a foot pedal connected with said rock shaft to move said movable member to clamping position, a spring connected between said foot pedal and said cradle to restore said movable clamping member to inoperative position, a rack bar pivotally connected with said movable clamping member, a detent for said rack bar, a second foot-operated rock shaft pivotally connected with said rack bar, a flexible restraining device at the other end of said cradle adapted to lie across an animal in said cradle, a weight on one end of said flexible restraining device, a longitudinally extending toothed member pivoted to said cradle, any one of the teeth of which is adapted to be engaged by said flexible restraining device, a spring-pressed detent to engage said toothed member, a connection between said detent and said last-mentioned rock shaft, and a foot pedal connected with said last-mentioned rock shaft whereby both the head clamping device and the flexible restraining device may be simultaneously released.

11. In a restraining device for animals, a cradle, clamping devices at one end of said cradle to engage the head of an animal in said cradle, a flexible restraining device near the other end of said cradle, a loop on one edge of said cradle through which said flexible restraining device passes, a weight on one end of said flexible restraining device adapted to contact said loop to form a stop, and releasable latching devices on the other edge of said cradle adapted to hold said flexible restraining device latched against the body of the animal in said cradle, together with means for releasing said device.

RAY COE.